(12) United States Patent
Young

(10) Patent No.: US 8,937,445 B2
(45) Date of Patent: Jan. 20, 2015

(54) POWER SUPPLY AND METHOD FOR ELECTRIC LIGHTING DEVICE

(71) Applicant: Secure Manufacturing Pty Ltd, Ashbury, New South Wales (AU)

(72) Inventor: Malcolm Alexander Young, Strathfield (AU)

(73) Assignee: Secure Manufacturing Pty Ltd, Ashbury, New South Wales (AU)

( * ) Notice: Subject to any disclaimer, the term of this patent is extended or adjusted under 35 U.S.C. 154(b) by 0 days.

(21) Appl. No.: 13/949,528

(22) Filed: Jul. 24, 2013

(65) Prior Publication Data

US 2013/0307426 A1 Nov. 21, 2013

Related U.S. Application Data

(63) Continuation of application No. 12/886,857, filed on Sep. 21, 2010, now abandoned.

(30) Foreign Application Priority Data

Sep. 21, 2009 (AU) ................................ 2009904551

(51) Int. Cl.
*H05B 37/02* (2006.01)
*H05B 33/08* (2006.01)

(52) U.S. Cl.
CPC ........... *H05B 33/0809* (2013.01); *Y02B 20/347* (2013.01); *H05B 33/0845* (2013.01); *H05B 37/0254* (2013.01); *H05B 33/0815* (2013.01)
USPC ........................................ 315/307; 315/200 R

(58) Field of Classification Search
USPC .................. 315/291, 307, 200 R, 209 R, 246
See application file for complete search history.

(56) References Cited

U.S. PATENT DOCUMENTS

| 5,982,110 A * | 11/1999 | Gradzki | 315/247 |
| 7,259,524 B2 * | 8/2007 | Hausman et al. | 315/291 |
| 7,344,284 B2 * | 3/2008 | Lynam et al. | 362/345 |
| 7,367,499 B2 * | 5/2008 | Jwo | 235/383 |
| 7,512,166 B2 * | 3/2009 | Lyu et al. | 372/38.1 |
| 7,514,912 B2 * | 4/2009 | Shao et al. | 323/285 |
| 2007/0182338 A1 * | 8/2007 | Shteynberg et al. | 315/200 R |
| 2009/0212756 A1 * | 8/2009 | Shao et al. | 323/285 |

* cited by examiner

*Primary Examiner* — Minh D A
(74) *Attorney, Agent, or Firm* — Merchant & Gould P.C.

(57) ABSTRACT

Disclosed herein are a power control system (110) and method for a light emitting diode (LED) lighting device. The system includes a rectifier (125) to rectify an input voltage, a squaring module (145) for squaring the rectified input voltage to produce a squared input voltage value; a filter (155) to filter said squared input voltage; a first function generator (160) for applying a first function to determine a light control signal (165); a second function generator (170) for applying a second function to determine a conductance factor (175), wherein said first function and said second function are independent functions of the root mean square (RMS) value of said input voltage; a multiplier (180) for multiplying said first multiplier signal with said rectified input signal to determine a current control signal (185); and a power supply (190) for determining an input light power to said LED lighting device and an input load power to a dissipative load (120), dependent upon said light control signal (165), said current control signal (185) and said rectified input voltage (140).

18 Claims, 10 Drawing Sheets

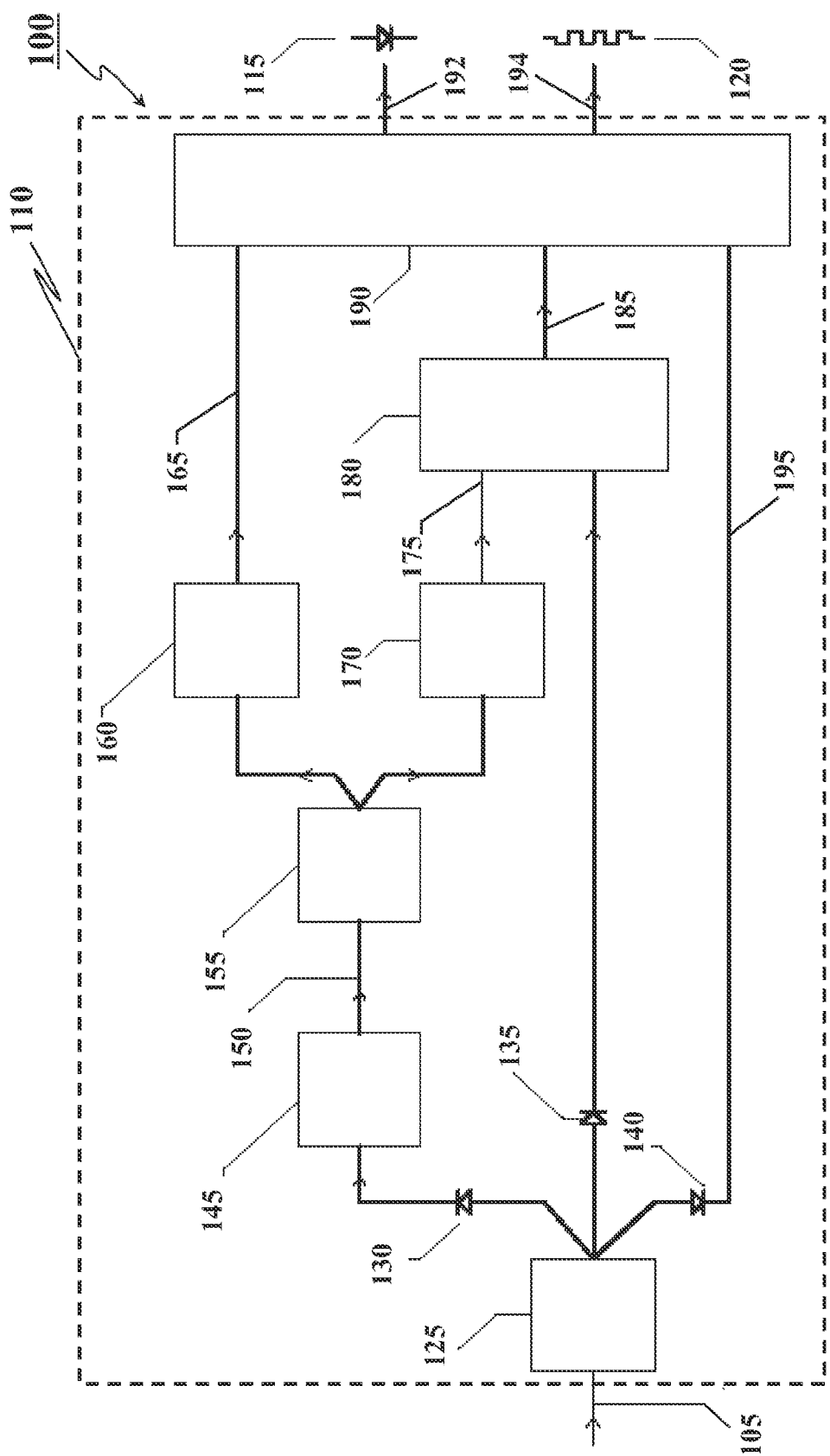

POWER SUPPLY AND METHOD FOR ELECTRIC LIGHTING DEVICE

REFERENCE TO RELATED PATENT APPLICATION(S)

This application is a Continuation of U.S. Ser. No. 12/886,857, filed 21 Sep. 2010, which claims benefit of Serial No. 2009904551, filed 21 Sep. 2009 in Australia and which application is incorporated herein by reference. To the extent appropriate, a claim of priority is made to the above disclosed application.

TECHNICAL FIELD

The present invention relates generally to electric lighting devices and, in particular, to power supplies for electric lighting devices. The present invention also relates to a method and apparatus for controlling power supply to an electric lighting device.

BACKGROUND

Artificial lighting devices are used to provide light at a desired intensity and location, and can be fixed, such as street lights, or mobile, such as hand-held torches. Artificial lights are used to illuminate dark areas, such as interiors of buildings or outdoor spaces at night. Illuminating dark areas can be used, for example, to facilitate navigation, improve security and safety, extend working and production hours, and increase leisure time. Examples of artificial lights include street lights, torches, floodlights, fluorescent light globes, and filament light globes.

In some applications, artificial lights are utilised to provide illumination of a predetermined area, such as a street or path. Controlling the intensity and/or the direction of light from an artificial lighting device can also be utilised to create atmosphere or ambience, such as in a restaurant. Another application of artificial lighting devices is to focus light in a predetermined manner to guide and control the movement of people, vessels, and vehicles. Such lighting devices include, for example, beacons, warning lights, lighthouses, headlights, tail-lights, and traffic signal lanterns.

Traditionally, signal lanterns have used incandescent filament lamps or quartz halogen lamps as a source of artificial light. The lamp is fitted at the focus of a parabolic reflector and the front of the reflector is fitted with a coloured lens that determines the colour of the signal. More recently, signal lanterns have been implemented using light emitting diodes (LEDs) as a light source. The LED lanterns, when compared with lanterns utilising incandescent filament lamps, have the advantage of lower power consumption and longer life.

Current lanterns use light sources that suffer a reduction in light output as those light sources age. This loss of light, which is often called lumen depreciation, causes designers to make lanterns that produce excessive light and consume excessive power in the early part of the lanterns' lives. The excess light can be so great as to be harmful and the extra power is just wasted. The production of excessive light and consumption of excessive power also reduces the lifetime of the LED.

For some kinds of LED, especially those used in red and yellow traffic light signals, the light output depends strongly on the operating temperature of the LED. The operating temperature is further affected by the local ambient temperature and by heating due to solar radiation. This again leads designers to compensate by applying extra power to the LEDs. Applying extra power to the LEDs exacerbates the power consumption and lumen depreciation problems. The combined effect is large and makes the design of red lanterns particularly problematic. LEDs work most efficiently when cold and least efficiently when the LEDs are hot, whereas the required light output is greatest during the day and least during the night.

In order to reduce the light output of an LED signal lantern for use at night, it may be necessary to apply less than a standard voltage to the LED signal lantern. However, typical LED signal lanterns have poor power factor and are difficult to operate with less than the standard voltage.

For the purpose of dimming the light output of a signal lantern, one approach is to reduce an applied voltage by reducing the amplitude of the applied alternating current (A.C.) mains voltage. Alternatively, a second approach uses a method known as "phase dimming" to dim a signal lantern, by removing part of the applied mains wave form through the use of a control element, such as a TRIAC. Both forms of dimming of a signal lantern can give the same applied root mean square (RMS) voltage. However, LED signal lanterns commonly produce different amounts of output light when different methods of dimming are utilised. This is in contrast to traditional incandescent lanterns, which do not behave in this manner and generally produce the same amount of output light, irrespective of the type of dimming method that is utilised.

An additional problem occurs when it is desired to determine the number of lanterns connected to a control system by measuring the total power consumed. This is readily determined when using incandescent lanterns, as the incandescent lanterns behave in a consistent manner. Since the relationship between an applied voltage and the consumed power for a LED signal lantern is commonly not the same as the voltage power relationship of an incandescent lantern and, more seriously, the relationship is also dependent on the applied voltage waveform, it is difficult to use power consumption as a means for assessing the number of LED lanterns connected to the control system.

Thus, a need exists to provide an improved method and system for controlling power supplied to electric lighting devices.

SUMMARY

Disclosed herein are a method and a power supply system for supplying power to a light source in which the output power delivered to the light source and the ratio of an instantaneous input voltage to an instantaneous input current are independent mathematical functions of the root mean square (RMS) value of the input voltage.

According to a first aspect of the present disclosure, there is provided a power supply system for controlling supply of power to an electric lighting device, said system comprising: a first function generator for generating a light control signal, dependent upon a first mathematical function of a root mean square (RMS) value of a received input voltage; a second function generator for generating a current control signal, dependent upon a second mathematical function establishing a ratio of instantaneous input voltage to instantaneous input current as a mathematical function of the RMS value of said received input voltage, wherein said first function and second function are independent of one another; and a power supply for presenting a light power signal to said electric lighting device and for presenting a load power to a dissipative load, dependent upon said light control signal, said current control signal, and said received input voltage.

According to a second aspect of the present disclosure, there is provided a power control system for a light emitting diode (LED) lighting device, said system comprising: a first function generator for utilising a first function to generate a light control signal dependent upon a received input voltage; a second function generator for utilising a second function to generate a conductance factor dependent upon said received input voltage, wherein said first function and said second function are independent functions of the root mean square (RMS) value of said input voltage; a multiplier for determining a current control signal dependent upon said first multiplier signal and said received input voltage; and a power supply for generating an input light power to present to said electric lighting device and an input load power to present to a dissipative load, dependent upon said light control signal, said current control signal, and said received input voltage.

According to a third aspect of the present disclosure, there is provided a method for controlling power supplied to a light emitting diode (LED) lighting device, said method comprising the steps of: determining a light control signal dependent upon a received input voltage and a first function, wherein said first function is a function of the root mean square (RMS) value of said received input voltage; determining a conductance factor dependent upon said received input voltage and a second function, wherein said second function is a function of the RMS value of said received input voltage, said first and second functions being independent of one another; determining a current control signal dependent upon said conductance factor and said received input voltage; and generating an input light power to present to said lighting device and an input load power to present to a dissipative load, dependent upon said light control signal, said current control signal, and said received input voltage.

According to a fourth aspect of the present disclosure, there is provided a power control system for a light emitting diode (LED) lighting device, said system comprising: a rectifier for rectifying a received input voltage; a squaring module for squaring said rectified input voltage to determine a squared voltage value proportional to the square of the received input voltage; a filter to filter said squared input voltage and produce a steady state signal; a first function generator for applying a first function to the steady state signal to determine a light control signal; a second function generator for applying a second function to the steady state signal to determine a conductance factor, wherein said first function and said second function are independent functions of the root mean square (RMS) value of said input voltage; a multiplier for multiplying said conductance factor with said rectified input signal to determine a current control signal; and a power supply for producing an input light power to said LED lighting device and an input load power to a dissipative load, dependent upon each of said light control signal, said current control signal, and said rectified input voltage.

According to a fifth aspect of the present disclosure, there is provided a method for controlling power supplied to a light emitting diode (LED) lighting device, said method comprising the steps of: rectifying a received input voltage waveform; squaring said rectified input voltage waveform to determine a squared voltage value proportional to the square of the received input voltage; filtering said squared input voltage to produce a steady state signal; applying a first function to the steady state signal to determine a light control signal, dependent upon said received input voltage; applying a second function to the steady state signal to determine a conductance factor, dependent upon said received input voltage, wherein said first function and said second function are independent functions of the root mean square (RMS) value of said input voltage; multiplying said conductance factor and said rectified input voltage waveform to determine a current control signal; and generating an input light power for presenting to said LED lighting device and an input load power for presenting to a dissipative load, dependent upon said light control signal, said current control signal, and said rectified input voltage.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

At least one embodiment of the present disclosure will now be described with reference to the drawings, in which:

FIG. 1 shows a schematic block diagram representation of a lighting supply system in accordance with the present disclosure;

DETAILED DESCRIPTION

Figure 2A:
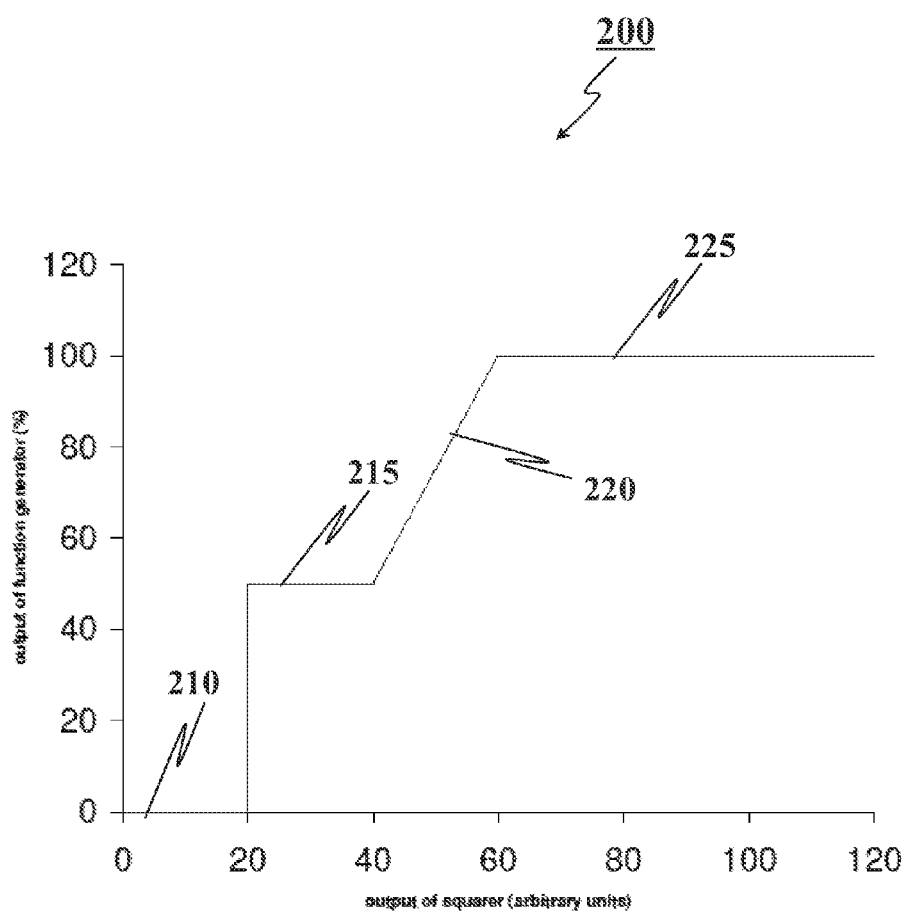
FIGS. 2A to 2C show examples of functions that may be utilised by embodiments of the present disclosure for controlling light output of an electric lighting device.

Where reference is made in any one or more of the accompanying drawings to steps and/or features that have the same reference numerals, those steps and/or features have for the purposes of this description the same function(s) or operation(s), unless the contrary intention appears.

The present disclosure provides a method, system, and computer-implemented method for controlling power applied to an electric lighting device, by separating and independently controlling light output of the electric lighting device and power consumption. In one embodiment, a power control system and method in accordance with the present disclosure supplies power to a lighting device according to a first control signal and consumes power according to a second control signal. If more power is to be consumed than the amount of power consumed by the lighting device, then the excess power is dissipated in a dissipative device. Thus, the system and method manage an input voltage waveform to deliver a desired power consumption for a lighting arrangement.

Independently controlling the light output of the electric lighting device and power consumption enables the power consumption of the electric lighting device to be closely modelled on the power consumption of an incandescent lantern. Further, the method and system of the present disclosure facilitate monitoring of one or more electric lighting devices and the light output of the electric lighting device can be controlled by the supply voltage in accordance with a predetermined function. The predetermined function may be chosen, for example, by a purchaser of the electric lighting device and can be implemented without substantially affecting the power consumption of the lighting device.

Embodiments of the present disclosure can be utilised, for example, to control power supplied to road traffic control lanterns, railway signal lanterns and operating theatre lighting, especially where monitoring of the lantern power or dimming is used. In particular, power control systems and methods in accordance with the present disclosure can be utilised to control power supplied to LED lighting devices so as to control the light output from the LED lighting devices while also independently controlling the overall power consumed by the LED lighting devices.

Embodiments of the present disclosure facilitate measuring power consumption of an electric lighting device, as the consumed power is related to the supply voltage and is independent of the supply voltage waveform. Further, embodiments of the present disclosure enable a light output for an electric lighting device to be selected with respect to an input mains voltage in a manner independent from the power consumption characteristic. When utilising LED light sources, it sometimes arises that a leakage of power to the input power supply cables can result in the LED light source being spuriously lit. In applications such as traffic or railway signal lanterns, spuriously lit light sources can have disastrous consequences. In embodiments of the present disclosure, power is consumed while the supplied input voltage is too low to illuminate the lighting device, so consequently leakage of power to the input power cables does not easily result in the electric lighting device being spuriously lit. Thus, in some applications the system and method of the present disclosure provides a safety feature.

Figure 5:
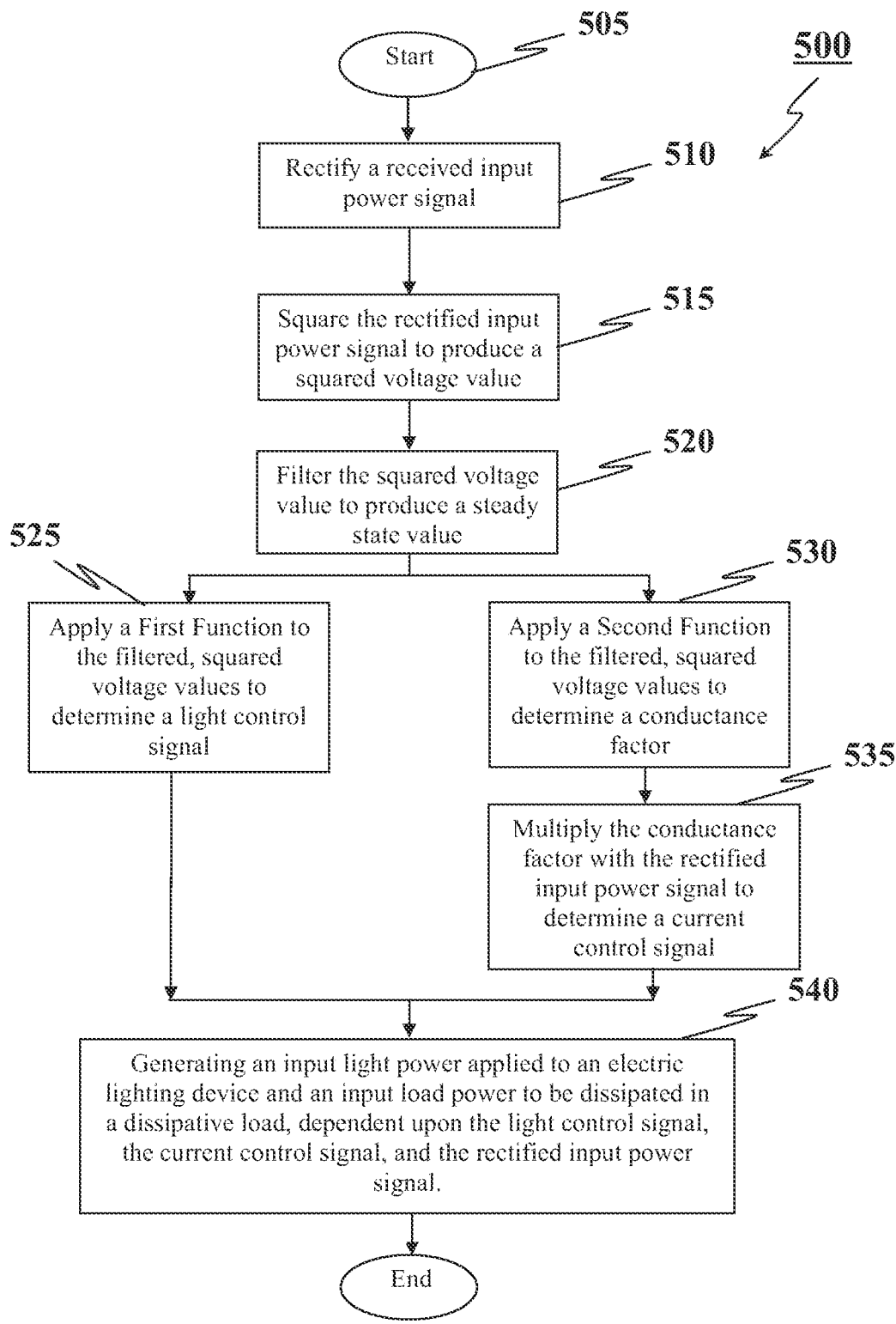
FIG. 5 is a flow diagram of a method for controlling power to an electric lighting device, in accordance with an embodiment of the present disclosure.

FIG. 5 is a flow diagram 500 of a method for controlling power to an electric lighting device, in accordance with an embodiment of the present disclosure. The method 500 begins at a Start step 505 and proceeds to a rectification step 510, in which a rectifier rectifies an input power supply to convert an alternating current (A.C.) power supply to a direct current (D.C.) input voltage. The input power supply may be derived from a mains power supply, for example. Control passes from step 510 to a squaring step 515, which squares the rectified power supply received from step 505 to determine a squared voltage value proportional to the square of the received input signal. The squaring produces a signal having an average value that is unaffected by the shape of the input voltage waveform.

Control passes from step 515 to a filtering step 520, which filters the squared voltage value by averaging the squared voltage values to produce a steady state signal. The filtering may be implemented, for example, by using a low pass filter. From step 520, control splits to each of a first function step 525 and a second function step 530. The first function step 520 applies a first function to the filtered, squared voltage values to determine a light control signal that is used to control an amount of light that is to be output from the electric lighting device. Control passes from step 525 to a power step 540.

Returning to step 530, the second function step 530 applies a second function to the filtered, squared voltage values to determine a conductance factor to be presented to a multiplier. The conductance factor is used to set the instantaneous current drawn by the power supply to be proportional to the instantaneous mains voltage applied. Control passes from step 530 to a multiplying step 535, which multiplies the conductance factor with the rectified power signal to determine a current control signal, which controls the instantaneous current drawn by a power supply.

The first function and second function may be selected independently of one another. The first function and second function are independent functions of the same input variable, being the root mean square (RMS) value of a received input voltage.

Control passes from step 535 to the power step 540. The power step 540 receives the light control signal from the first function step 525, the current control signal from step 535, and the rectified input power signal and determines an input light power that is applied to the electric lighting device to produce a desired light output. The power step also determines an input load power that is presented to a dissipative load to dissipate any excess power, if required. Control passes from step 540 to an End step 550 and the method terminates.

FIG. 1 shows a schematic block diagram representation of a lighting supply system 100 in accordance with the present disclosure. The lighting supply system 100 includes an input power supply 105, a power control system 110, a light source 115, and a dissipative load 120. The power control system 110 receives the input power supply 105 and produces outputs in the form of: (i) an input light power 192 that is applied to the light source 115; and (ii) an input load power 194 that is applied to the dissipative load 120. In the example shown, the light source 115 is an LED signal lantern comprising one or more LEDs. Controlling the input light power 192 directly controls the light output of the light source 115. Controlling the input power load 194 controls the power consumption of the lighting supply system 100 in conjunction with the light source 115 and the dissipative load 120.

The power control system 110 includes a rectifier 125 that receives the applied input power supply 105 and produces a rectified output that is presented to each of a first isolation diode 130, a second isolation diode 135 and a third isolation diode 140. One implementation of the rectifier 125 utilises a bridge rectifier comprising four diodes to convert an alternating current input power supply to a direct current input voltage, as would be readily understood by a person skilled in the relevant art. The diodes may be silicon diodes type 1N4004, for example. The first isolation diode 130, second isolation diode 135, and third isolation diode 140 are optional and are utilised to prevent undesirable interactions. The first isolation diode 130, second isolation diode 135, and third isolation diode 140 may be implemented using silicon diodes type 1N4004, for example. While silicon diodes 1N4004 are mentioned as examples above, other diodes may equally be utilised without departing from the spirit and scope of the present disclosure.

The first isolation diode 130 receives the rectified power output from the rectifier 125 and passes the rectified power output to a squaring module 145. The input power supply 105 can utilise input voltages of many different waveforms, including, for example, sinusoidal waveforms, phase-cut waveforms, triangular waveforms, and square waveforms. The squaring module 145 squares the rectified power output and determines a squared voltage value 150 that is provided to a filter 155. The squared voltage value 150 is proportional to the square of a received input signal. The squaring produces a signal having an average value that is unaffected by the shape of the input voltage waveform. This enables control of the light output by the light source 115 to be indifferent to the method of dimming. It is clear that a value proportional to the RMS value of the input voltage can be simply derived from the output of the filter 155 by applying a square root function. Such a function may, for example, form part of subsequent first and second function generators 160 and 170. If the squaring module is of a kind that can properly accept inputs of either polarity, the squaring module may receive an alternating input proportional to the input at 105 without the need for rectification by diodes or bridges.

In one implementation, the squaring module 145 is implemented by sampling a number of instantaneous values of the rectified power output and then squaring those instantaneous values to determine the squared voltage value 150. The squaring module 145 can be implemented in hardware, firmware, software, or any combination thereof. In one embodiment, the squaring module 145 is implemented by using a log-antilog multiplier. An alternative embodiment utilises a pulse width-pulse height method to implement the squaring module 145.

The filter 155 receives the squared voltage 150 and averages the squared voltage values to produce a steady state signal that is readily comparable to one or more set values or steady state values. The output of the filter 155 is proportional to the average of the square of the voltage of the input power supply 105.

A tungsten filament lamp has a resistance that changes as the filament heats up over time; the resistance of a tungsten filament is low when cool and increases when the filament is hot. In a signalling application in which a tungsten filament is "on" for a short time period, any change in the resistance of the filament is negligible. It is desirable for a LED lighting device coupled to the power control system 110 to present a load that is similar to that of a tungsten filament load. This facilitates retro-fitting of LED lighting devices to existing lighting arrangements. Further the LED lighting device will appear as a tungsten filament load to the power supply, but the light output of the LED lighting device will have a different characteristic relative to the input voltage. One characteristic of the light output may be that the light output does not change relative to the input voltage. That is, the lighting device is either "on" or "off", and produces a constant light output when "on". The filter 155 simulates the thermal component of a tungsten filament lamp. Another characteristic uses different output light levels for different times of day, different seasons, or even combinations thereof.

The filter 155 can be implemented using hardware, firmware, software, or a combination thereof. The filter 155 may be implemented by utilising, for example, a 2-pole Bessel-type low pass filter of the Sallen-Key type, made using operational amplifiers type LM321, or by using switched capacitor techniques. In such an embodiment, the cutoff frequency could be set to approximately 15 Hz. The actual filter characteristic implemented will depend on the particular application and may include, for example, a Thompson or Butterworth characteristic. The pass band and stop band characteristics are selected such that the output of the filter is substantially free from fundamental and harmonic components of the power line mains frequency. The filter should preferably not delay low frequency signals excessively. In particular, the delay should be less than 100 ms, and preferably less than 50 ms, so that the significance of the information or status conveyed by the illumination of the light is made visible in a timely manner and that any variation in the current consumption of the light is approximately contemporaneous with the variation in the voltage that caused that variation.

These constraints determine a range of suitable filter characteristics that may be used. The filter may also be implemented using digital computing techniques using well know finite impulse response (FIR) or infinite impulse response (IIR) filters. It will be appreciated by a person skilled in the art that other filters may equally be practised without departing from the spirit and scope of the present disclosure.

The squared voltage values output from the filter 155 are presented to each of a first function generator 160 and a second function generator 170. The first function generator 160 receives the squared voltage values, applies a first function to those squared voltage values, and generates a light control signal 165 that is supplied to a power supply 190. The light control signal 165 controls the amount of light that is to be output from the light source 115 by controlling the input light power 192 applied by the power supply 190 to the light source 150. The first function is selected such that the light output from the light source 115 is a selected function of the root mean square (RMS) voltage of the input power supply 105. As indicated above, the output of the filter 155 is proportional to the average of the square of the voltage of the input power supply 105. Thus, the output of the filter 155 can be used in place of the RMS value of the voltage of the input power supply when the first function generator 160 includes a square root component.

The second function generator 170 receives the filtered squared voltage values from filter 155, applies a second function to those filtered squared voltage values, and generates a first multiplier input to a multiplier 180 in the form of a conductance factor 175. The conductance factor 175 is utilised to control the current drawn by the lighting system 100 and hence its power consumption In particular, the instantaneous current drawn by the power supply 190 is set to be proportional to the instantaneous mains voltage applied, so that the power supply 190 appears to be equivalent to a resistor with a value equal to the ratio of the applied voltage and current drawn. Since the power supply 190 comprises a substantial portion of the total load presented by the lighting system 100, the lighting system 100 also appears to be similarly equivalent to that resistor. In one embodiment, the second function is a transfer function, wherein an output of the second function generator 170 is a power function of the input. The typical power (exponent) would be a small number, about −0.2. This transfer function can be implemented using analog circuitry by log-antilog techniques or alternatively by using a method described by Barrie Gilbert in "*Translinear circuits: a proposed classification,*" Gilbert, B., *Electronics Letters*, 11-1, 1975, pp. 14-16 using bipolar transistors and resistors to define the power function. The second function may equally be implemented by using, for example, a break-point type function. One embodiment implements a second function generator 170 that utilises a break-point type function made using operational amplifiers type LM321 and with break-points set using Zener diodes.

The second isolation diode 135 receives the rectified power output from the rectifier 125 and passes the rectified power output to the multiplier 180. The multiplier 180 multiplies the conductance factor 175, provided by the second function generator 170, with the rectified power output received from the second isolation diode 130 to generate a current control signal 185 that is presented to the power supply 190. The current control signal 185 is the instantaneous product of the conductance factor 175 and the signal received from the second diode 135. The current control signal 185 controls the instantaneous current drawn by the power supply 190. It will be appreciated that the second function generator 170 and the multiplier 180 may be implemented as an integral unit.

The multiplier 180 receives two inputs, a conductance factor 175 and a voltage factor in the form of the rectified power output from the second diode 135, and produces a current control signal 185. The current drawn by the lighting device 115 is proportional to the product of the voltage factor and the conductance factor. When considered as a resistor, the resistance of the lighting device 115 is inversely proportional to the conductance factor (which is dimensionally appropriate). The conductance factor is derived from the filtered output of the squarer 145 being modified by the first function generator 170. The most useful functions for function generator 170 will typically be small negative power functions.

Embodiments of the present disclosure may equally utilise a divider in place of the multiplier 180, and by using a resistance factor in place of the conductance factor. The resistance factor would differ from the conductance factor, but still be derived from the filtered squarer output by choosing a different characteristic for the first function generator 170. In this case, the most useful functions for function generator 170 will typically be small positive power functions.

One embodiment implements the multiplier 180 as an analog function using a Barrie cell, which is a common arrangement for performing a multiplication function. Alternative embodiments can utilise, for example, log-antilog methods or digital computing techniques.

The current control signal 185 is proportional to the instantaneous mains voltage using a signal from the second isolation diode 135 and a predetermined function of the filtered squared signal, as applied by the second function generator 170. By varying the function implemented by the second function generator 170, the lighting system 100 may be made to behave, with respect to power consumption, like an incandescent lamp or, alternatively, like a resistor having a constant value. These two behaviours are set by choosing a second function applied by the second function generator 170 such that the conductance factor 175 output from the second function generator 170 is proportional to 1/sqrt(mains voltage) to approximate an incandescent lamp or by making the conductance factor 175 to be constant.

In one embodiment, the current of an incandescent lamp is assumed to be proportional to the voltage raised to the 0.5 power. The conductance of a typical tungsten filament lamp is known to vary as the −0.4 power of the applied RMS voltage. In one embodiment, the function generator 170 is configured to generate a −0.2 power function to simulate this behaviour. The value of −0.2 is made up as a power of 0.5 to obtain the RMS value from the filtered squared input multiplied by −0.4 to account for the −0.4 power function of the conductance variation with RMS voltage yielding a total power function of −0.2. The multiplier 180 can be implemented in hardware, firmware, software, or any combination thereof. In one embodiment, the multiplier 180 is implemented by using a log-antilog multiplier. An alternative embodiment utilises a pulse width-pulse height method to implement the multiplier 180.

The third isolation diode 140 receives the rectified power output from the rectifier 125 and passes a rectified power output 195 to the power supply 190. The power supply 190 presents the input power load 194 to a dissipative load 120 to control the power consumption of the lighting supply system 100 by dissipating any excess power. One embodiment implements the dissipative load 120 by using a resistor, a Zener diode, an active device dissipating power, a shunt regulator, or a combination thereof.

Figure 6:
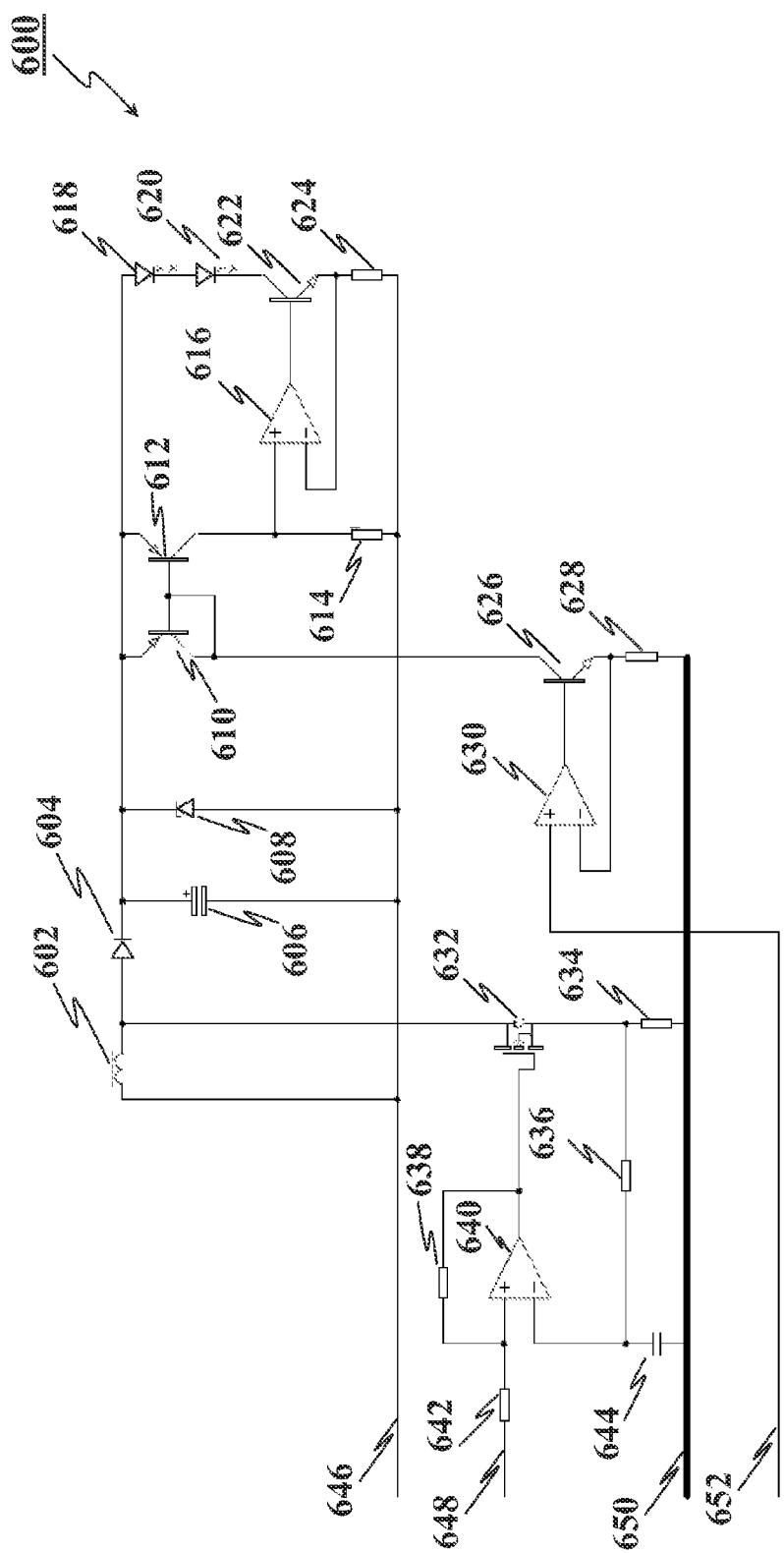
FIG. 6 is a schematic block diagram representation of an embodiment of a power supply in accordance with the present disclosure.
Figure 7:
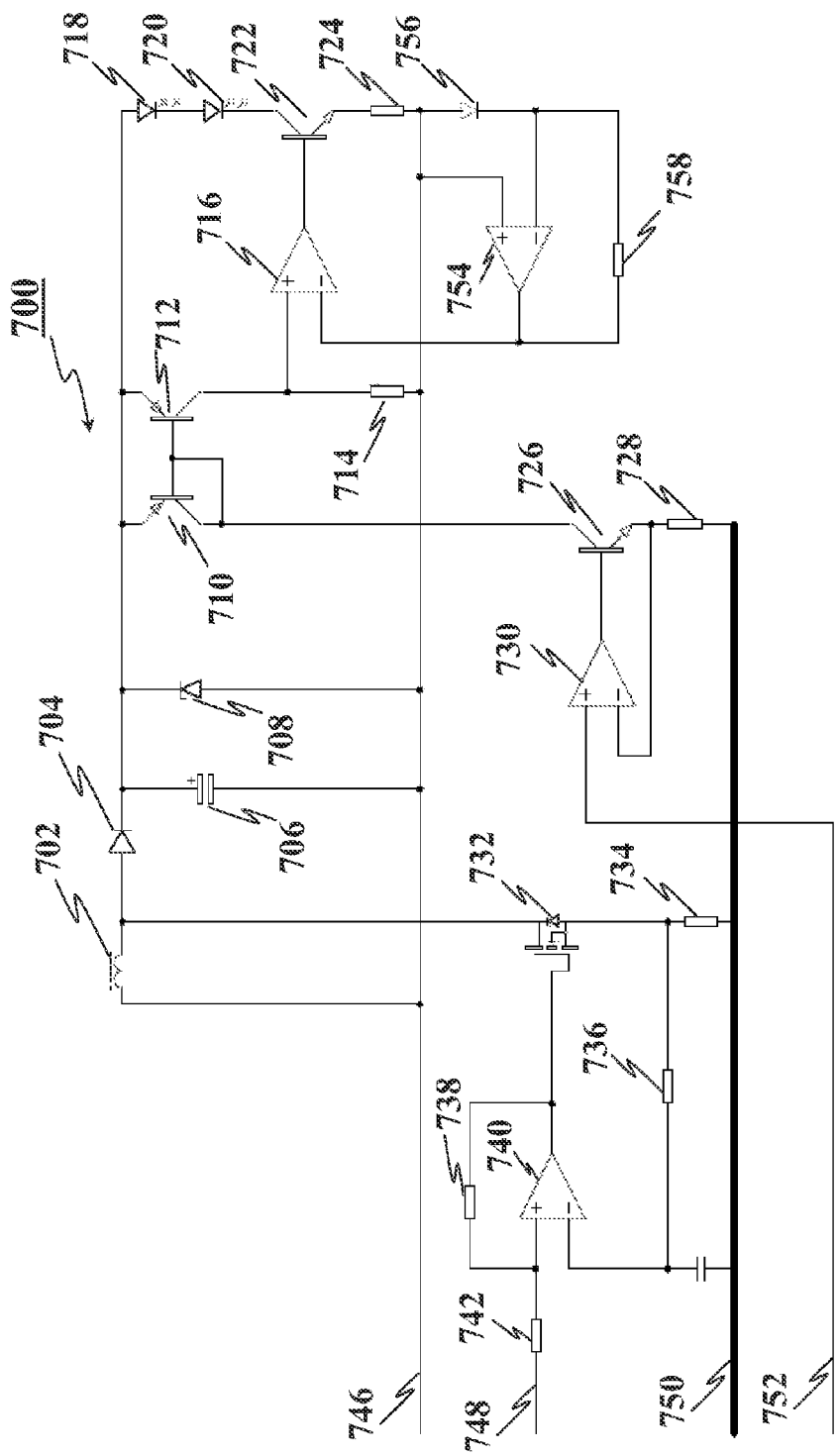
FIG. 7 is a schematic block diagram representation of an embodiment of a power supply in accordance with the present disclosure.

FIGS. 6 and 7 are schematic block diagram representations of two embodiments of the power supply 190 of FIG. 1. FIG. 6 shows a power supply 600 that includes a comparator 640. The comparator 640 acts as an oscillator driving the gate terminal of a MOSFET 632. The MOSFET 632, together with a first inductor 602, a first diode 604, and a reservoir capacitor 606, forms a switching power supply of the flyback kind. The current drawn by the flyback power supply passes through a current sense resistor 634. The voltage developed across the current sense resistor 634 has a pulsing waveform. This voltage signal is filtered by a low pass filter comprising a first resistor 636 and a second capacitor 644 and is fed to an inverting input of the comparator 640.

The comparator 640 is made to oscillate by providing positive feedback via a second resistor 638. In operation, an input voltage fed into terminal 648 determines the current drawn by the flyback power supply, such that the average current passing through the current sense resistor 634 is made to be equal or substantially equal to the input voltage applied at terminal 648. It is to be understood that the value of the second resistor 638 is much greater than the value of a third resistor 642. In operation, the flyback power supply receives power from terminal 646, corresponding to the rectified power output 195 from the third isolation diode 140 of FIG. 1, and charges the reservoir capacitor 606 to a voltage greater than the voltage present on terminal 646. Since the flyback power supply current consumption is determined externally from the flyback power supply, by the voltage present on terminal 648, the flyback power supply may produce more power than LED lighting devices 618, 620 can properly consume in the production of the desired amount of light. The LEDs 618, 620 correspond to the lighting device 115 of FIG. 1. This excess power is dissipated in a Zener diode 608, corresponding to the dissipative load 120 of FIG. 1, which is chosen to be of a suitable size and rating for this purpose.

The operating current of the LEDs 618, 620 is controlled by the control voltage presented to terminal 652. The control voltage determines the collector current in a bipolar transistor 626, which together with a fourth resistor 628 and an operational amplifier 630 forms a precision current sink. This collector current controls the collector current in a bipolar transistor 612, which together with a bipolar transistor 610 forms a current mirror. It is preferable that transistors 610 and 612 are closely matched and at the same temperature as each other. Properly matched and thermally connected current mirror devices are commercially available. The collector current of transistor 612 can thus be made proportional to the applied control voltage at terminal 652. The collector current of transistor 612 passes through a fifth resistor 614 developing a voltage relative to the raw variable rectified voltage appearing on terminal 646, that is proportional to the applied input voltage at terminal 652, which is relative to the common return rail at terminal 650. The voltage across the fifth resistor 614 controls the current through the LEDs 618, 620 using a transistor 622, a sixth resistor 624 and an operational amplifier 616, which form a controllable precision current sink.

FIG. 7 shows an alternative implementation of the power supply 190 of FIG. 1. FIG. 7 shows a power supply 700 that includes a comparator 740. The comparator 740 acts as an oscillator driving the gate terminal of a MOSFET 732. The MOSFET 732, together with a first inductor 702, a first diode 704, and a reservoir capacitor 706, forms a switching power supply of the flyback kind. The current drawn by the flyback power supply passes through a current sense resistor 734. The voltage developed across the current sense resistor 734 has a pulsing waveform. This voltage signal is filtered by a low pass filter comprising a first resistor 736 and a second capacitor 744 and is fed to an inverting input of the comparator 740.

The comparator 740 is made to oscillate by providing positive feedback via a second resistor 738. In operation, an input voltage fed into terminal 748 determines the current drawn by the flyback power supply, such that the average current passing through the current sense resistor 734 is made to be equal or substantially equal to the input voltage applied at terminal 748. It is to be understood that the value of the second resistor 738 is much greater than the value of a third resistor 742. In operation, the flyback power supply receives power from terminal 746, corresponding to the rectified power output from the third isolation diode 140 of FIG. 1, and charges the reservoir capacitor 706 to a voltage greater than the voltage present on terminal 746. Since the flyback power supply current consumption is determined externally from the flyback power supply, by the voltage present on terminal 748, the flyback power supply may produce more power than LED lighting devices 718, 720 can properly consume in the production of the desired amount of light. The LED lighting devices 718, 720 correspond to the lighting device 115 of FIG. 1. This excess power is dissipated in a Zener diode 708, which is chosen to be of a suitable size and rating for this purpose. The Zener diode 708 corresponds to the dissipative load 120 of FIG. 1.

The operating current of the LEDs 718, 720 is controlled by the control voltage presented to terminal 752. The control voltage determines the collector current in a bipolar transistor 726, which together with a fourth resistor 728 and an operational amplifier 730 forms a precision current sink. This collector current controls the collector current in a bipolar transistor 712, which together with a bipolar transistor 710 forms a current mirror. It is preferable that transistors 710 and 712 are closely matched and at the same temperature as each other. Properly matched and thermally connected current mirror devices are commercially available. The collector current of transistor 712 can thus be made proportional to the applied control voltage at terminal 752. The collector current of transistor 712 passes through a fifth resistor 714 developing a voltage relative to the raw variable rectified voltage appearing on terminal 746, that is proportional to the applied input voltage at terminal 752, which is relative to the common return rail at terminal 750. The voltage across the fifth resistor 714 controls the current through the LEDs 718, 720 using a transistor 722, a sixth resistor 724 and an operational amplifier 716, which form a controllable precision current sink.

The power supply 700 of FIG. 7 operates similarly to the power supply 600 of FIG. 6, except that the voltage developed across the sixth resistor 714 controls the current through LEDs 718 and 720, such that light output from the LEDs 718, 720, as sensed by a light sensor 756, is set at a value dependent upon the control voltage at terminal 752. In this embodiment, it is understood that the light sensor 756, which may be implemented using, for example, a photodiode, is illuminated by the LEDs 718, 720. Operational amplifier 754 and resistor 758 convert the current produced by photodiode 756 to a voltage proportional to that current.

While FIG. 1 shows the power control system 110 separate from the light source 115 and the dissipative load 120, it will be appreciated by a person skilled in the art that other embodiments may equally be practised in which the power control system 110 is integral with either one or both of the light source 115 and the dissipative load 120. The light source 115 and the dissipative load 120 may also be implemented as an integral unit. Further, the components of the power control system 110 may be implemented as discrete components, integrated components, or any combination thereof, without departing from the spirit and scope of the present disclosure.

As described above, the first function generator 160 applies a first function to the squared voltage values to determine a light control signal 165, wherein the light control signal 165 is utilised to control the amount of light that is to be output from the light source 115. The first function implemented by the first function generator 160 defines a relationship between the amount of light to be output from the light source 115 and the input voltage from the input power supply 105. One embodiment utilises a break point type function, which produces the following outputs:

(i) 0, for voltages up to 60% of a nominal mains voltage value;
(ii) 50%, for mains voltages from 60% to 85% of the nominal mains voltage value; and
(iii) 100%, for mains voltages greater than 85% of the nominal mains voltage value.

It will be appreciated that the actual break-points used will depend on the particular application. Various embodiments may equally be practised using more or fewer break-points. For example, an alternative embodiment sets the light output to be constant for mains voltages above 60% of the nominal mains voltage and a further alternative embodiment sets the light output to be proportional to the square of the mains voltage value. Alternative embodiments utilise linear functions or exponential functions, with or without break-points, for the first function, depending upon the particular application. The first function generator 160 can be implemented in hardware, firmware, software, or any combination thereof. One embodiment implements a first function generator 160 as an analog function using, for example, log-antilog devices or translinear techniques. One embodiment implements a first function generator 160 that utilises a break-point type function made using operational amplifiers type LM321 and with break-points set using Zener diodes. A further embodiment uses digital computing techniques.

Figure 2B:
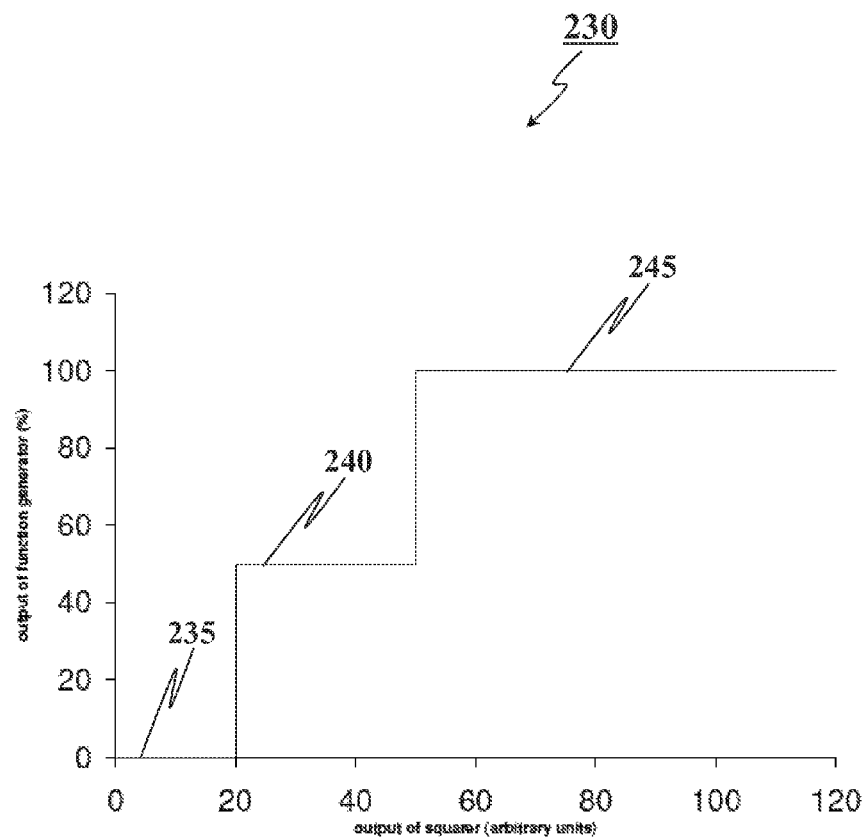
Figure 2C:
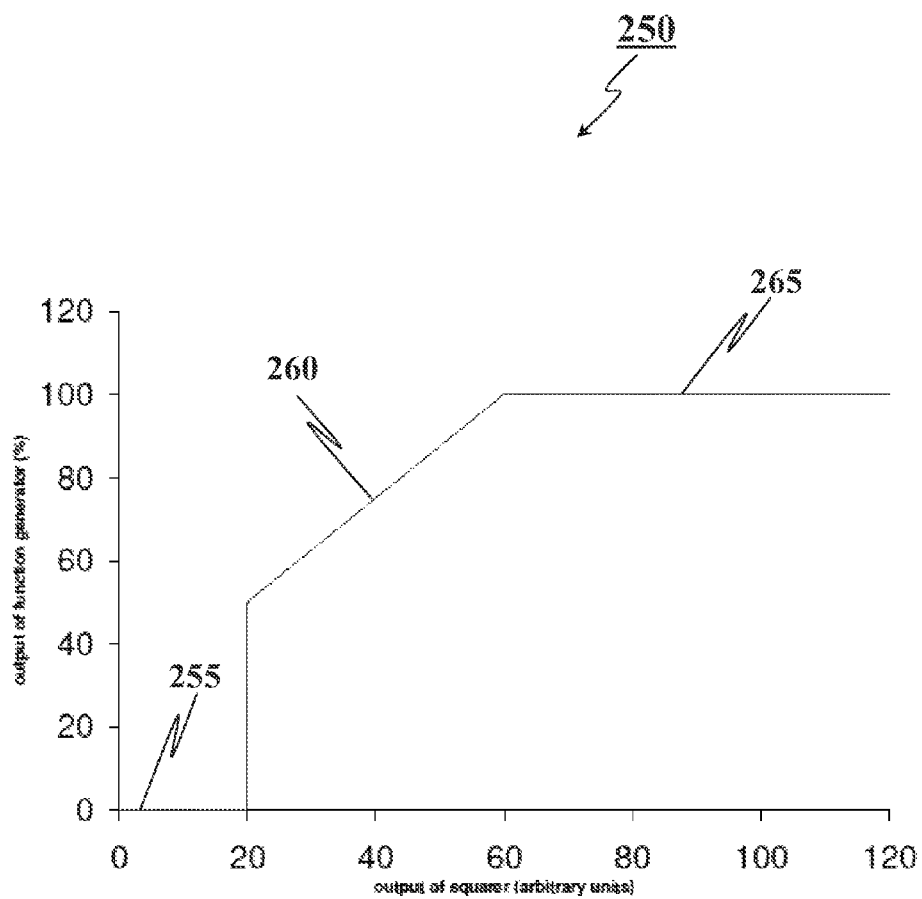

FIGS. 2A to 2C show examples of functions that may be utilised by the first function generator 160 for various embodiments to control the light output of an LED lighting device 115 coupled to the power control system 110 of FIG. 1. The vertical axis in each graph shows an intended LED light output as a percentage of maximum output. This may alternatively refer to LED current or LED power. The horizontal axis in each graph shows the filtered output of the squaring module 145 in arbitrary units. Other characteristics are possible, including smooth continuous characteristics. Useful characteristics include those that are zero below some specified input value and are constant above some other input value. The three graphs shown in FIGS. 2A to 2C illustrate this useful characteristic. While not illustrated on the graphs of FIGS. 2A to 2C, the first function generator 160 may optionally include features to compensate for characteristics of the power supply to achieve the stated percentages. Where a characteristic with a step change is used, some degree of hysteresis may also be applied.

FIG. 2A shows a graph of a function 200 that may be utilised by the first function generator 160. The first function 200 establishes a relationship between the light control signal 165 and the output of the filter 155. The units of the output of the squaring means are arbitrary. During a first period 210 when the output of the filter 155 is less than 20, the light control signal 165 is set to 0. During a second period 215 when the output of the filter 155 is between 20 and 40, the light control signal 165 is set to 50. During a third period 220, when the output of the filter 155 is between 40 and 60, the light control signal 165 is set to value between 50 and 100, based on a linear function with respect to the output of the filter 155. During a fourth period 225, when the output of the filter 155 is between 60 and 120, the light control signal 165 is set to 100.

FIG. 2B shows a graph of a function 230 that may be utilised by the first function generator 160. The function 230 establishes a relationship between the light control signal 165 and the output of the filter 155. The units of the output of the squaring means are arbitrary. During a first period 235 when the output of the filter 155 is less than 20, the light control signal 165 is set to 0. During a second period 240 when the output of the filter 155 is between 20 and 40, the light control signal 165 is set to 50. During a third period 245, when the output of the filter 155 is between 60 and 120, the light control signal 165 is set to 100.

FIG. 2C shows a graph of a function 250 that may be utilised by the first function generator 160. The function 250 establishes a relationship between the light control signal 165 and the output of the filter 155. The units of the output of the squaring means are arbitrary. During a first period 255 when the output of the filter 155 is less than 20, the light control signal 165 is set to 0. During a second period 260 when the output of the filter 155 is between 20 and 40, the light control signal 165 is set to a value between 50 and 100, based on a linear function with respect to the output of the filter 155. During a third period 265, when the output of the filter 155 is between 60 and 120, the light control signal 165 is set to 100.

In one implementation, the power supply 190 is a switching power supply with a shunt-type regulator functioning as the dissipative load 120 for absorbing excess power. The power supply 190 controls consumption of power fed from the rectifier 125, such that the instantaneous current drawn is determined by the conductance factor 175. The power supply 190 applies power to the lighting source 115 so that the light emitted from the lighting source 115 is determined by the light control signal 165 output from the first function generator 160. The power supply optionally includes short term energy storage, which may be implemented using reservoir capacitors or the like, so that the lighting source 115 remains continuously lit throughout the whole of the mains cycle. Any power consumed by the power supply in excess of that required by the lighting device 115 is lost as heat in the dissipative load 120, which in one embodiment is a Zener diode.

Figure 3A:
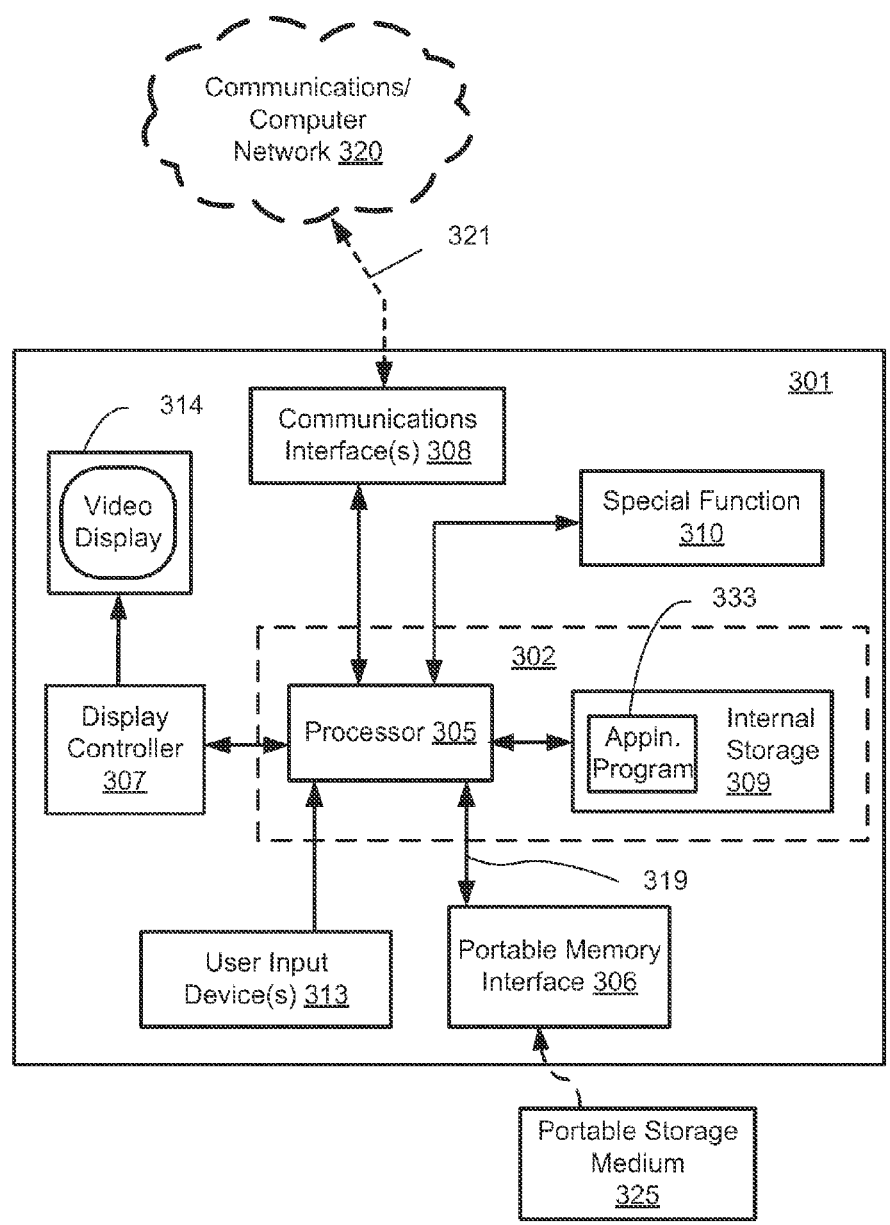
FIGS. 3A and 3B collectively form a schematic block diagram representation of an electronic device upon which described arrangements can be practised.
Figure 3B:
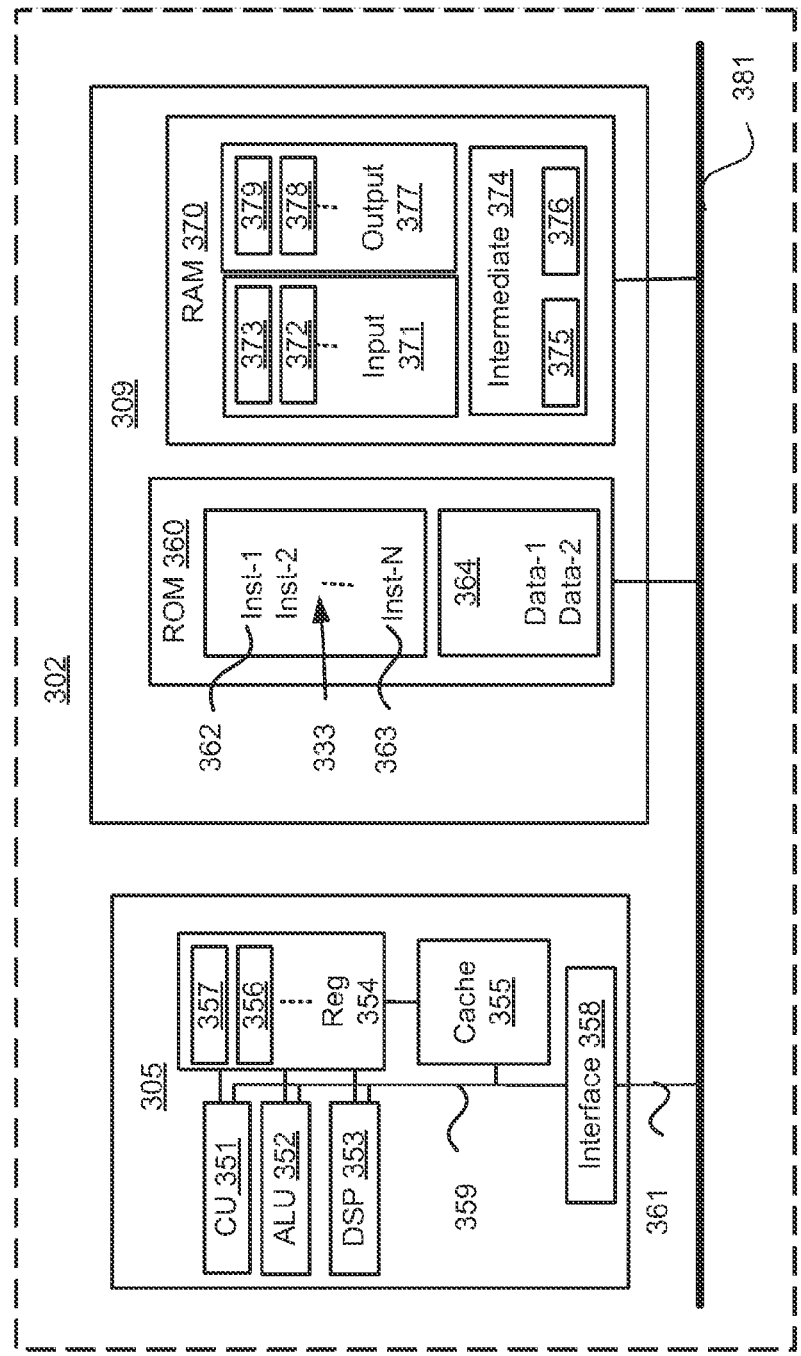

FIGS. 3A and 3B collectively form a schematic block diagram of a general purpose electronic device 301 including embedded components, upon which the power and light control methods described herein are desirably practised. The electronic device 301 may be, for example, a railway signal lantern, a traffic signal lantern, a guidance system, or other illumination apparatus, in which processing resources are limited. Nevertheless, the methods described herein may also be performed on higher-level devices such as desktop computers, server computers, and other such devices with significantly larger processing resources. For example, the power and light control methods described herein may be performed on a traffic control server that is coupled to one or more external lighting devices. Alternatively, the power and light control methods described herein may be performed on an embedded device co-located with, or proximate to, a light source and forming a traffic signal lantern.

As seen in FIG. 3A, the electronic device 301 comprises an embedded controller 302. Accordingly, the electronic device 301 may be referred to as an "embedded device". In the present example, the controller 302 has a processing unit (or processor) 305 that is bi-directionally coupled to an internal storage module 309. The storage module 309 may be formed from non-volatile semiconductor read only memory (ROM) 360 and semiconductor random access memory (RAM) 370, as seen in FIG. 3B. The RAM 370 may be volatile, non-volatile or a combination of volatile and non-volatile memory.

The electronic device 301 optionally includes a display controller 307, which is connected to a video display 314, such as a liquid crystal display (LCD) panel or the like. The display controller 307 is configured for displaying graphical images on the video display 314 in accordance with instructions received from the embedded controller 302, to which the display controller 307 is connected.

The electronic device 301 also includes user input devices 313, which are typically formed by keys, a keypad, DIP switches, or like controls. In some implementations, the user input devices 313 may include a touch sensitive panel physically associated with the display 314 to collectively form a touch-screen. Such a touch-screen may thus operate as one form of graphical user interface (GUI), as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 3A, the electronic device 301 also comprises a portable memory interface 306, which is coupled to the processor 305 via a connection 319. The portable memory interface 306 allows a complementary portable memory device 325 to be coupled to the electronic device 301 to act as a source or destination of data or to supplement the internal storage module 309. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 301 also has a communications interface 308 to permit coupling of the device 301 to a computer or communications network 320 via a connection 321. The connection 321 may be wired or wireless. For example, the connection 321 may be radio frequency or optical. An example of a wired connection includes Ethernet. Further, an example of wireless connection includes a Bluetooth type local interconnection, Wi-Fi (including protocols based on the standards of the IEEE 802.11 family), Infrared Data Association (IrDa), and the like.

Typically, the electronic device 301 is configured to perform some special function. The embedded controller 302, possibly in conjunction with further special function components 310, is provided to perform that special function. For example, where the device 301 is a digital camera, the components 310 may represent a lens, focus control and image sensor of the camera. Where the device 301 is a traffic signal lantern, the components 310 may represent a light sensor, and/or digital and analog inputs and outputs, and/or components required for communicating with a server or other traffic signal lanterns. The special function components 310 are connected to the embedded controller 302. As another example, the device 301 may be a mobile telephone handset. In this instance, the components 310 may represent those components required for communications in a cellular telephone environment. Where the device 301 is a portable device, the special function components 310 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 302, wherein one or more of the processes described herein with reference to FIG. 1, FIG. 5, and Tables 1 to 6 may be implemented as one or more software application programs 333 executable within the embedded controller 302. The electronic device 301 of FIG. 3A implements the described methods. In particular, with reference to FIG. 3B, the steps of the described methods are effected by instructions in the software 333 that are carried out within the controller 302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 333 of the embedded controller 302 is typically stored in the non-volatile ROM 360 of the internal storage module 309. The software 333 stored in the ROM 360 can be updated when required from a computer readable medium. The software 333 can be loaded into and executed by the processor 305. In some instances, the processor 305 may execute software instructions that are located in RAM 370. Software instructions may be loaded into the RAM 370 by the processor 305 initiating a copy of one or more code modules from ROM 360 into RAM 370. Alternatively, the software instructions of one or more code modules may be pre-installed in a non-volatile region of RAM 370 by a manufacturer. After one or more code modules have been located in RAM 370, the processor 305 may execute software instructions of the one or more code modules.

The application program 333 is typically pre-installed and stored in the ROM 360 by a manufacturer, prior to distribution of the electronic device 301. However, in some instances, the application programs 333 may be supplied to the user encoded on one or more CD-ROM (not shown) and read via the portable memory interface 306 of FIG. 3A prior to storage in the internal storage module 309 or in the portable memory 325. In another alternative, the software application program 333 may be read by the processor 305 from the network 320, or loaded into the controller 302 or the portable storage medium 325 from other computer readable media. Computer readable storage media refers to any non-transitory tangible storage medium that participates in providing instructions and/or data to the controller 302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 301. Examples of transitory or non-tangible computer readable transmission media that may also participate in the provision of software, application programs, instructions and/or data to the device 301 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 333 and the corresponding code modules mentioned above may be executed to implement one or more graphical user interfaces (GUIs) to be rendered or otherwise represented upon the display 314 of FIG. 3A. Through manipulation of the user input device 313 (e.g., the keypad), a user of the device 301 and the application programs 333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 3B illustrates in detail the embedded controller 302 having the processor 305 for executing the application programs 333 and the internal storage 309. The internal storage 309 comprises read only memory (ROM) 360 and random access memory (RAM) 370. The processor 305 is able to execute the application programs 333 stored in one or both of the connected memories 360 and 370. When the electronic device 301 is initially powered up, a system program resident in the ROM 360 is executed. The application program 333 permanently stored in the ROM 360 is sometimes referred to as "firmware". Execution of the firmware by the processor 305 may fulfil various functions, including processor management, memory management, device management, storage management and user interface.

The processor 305 typically includes a number of functional modules including a control unit (CU) 351, an arithmetic logic unit (ALU) 352 and a local or internal memory comprising a set of registers 354 which typically contain atomic data elements 356, 357, along with internal buffer or cache memory 355. One or more internal buses 359 interconnect these functional modules. The processor 305 typically also has one or more interfaces 358 for communicating with external devices via system bus 381, using a connection 361.

The application program 333 includes a sequence of instructions 362 though 363 that may include conditional branch and loop instructions. The program 333 may also include data, which is used in execution of the program 333. This data may be stored as part of the instruction or in a separate location 364 within the ROM 360 or RAM 370.

In general, the processor 305 is given a set of instructions, which are executed therein. This set of instructions may be organised into blocks, which perform specific tasks or handle specific events that occur in the electronic device 301. Typically, the application program 333 waits for events and subsequently executes the block of code associated with that event. Events may be triggered in response to input from a user, via the user input devices 313 of FIG. 3A, as detected by the processor 305. Events may also be triggered in response to other sensors and interfaces in the electronic device 301.

The execution of a set of the instructions may require numeric variables to be read and modified. Such numeric variables are stored in the RAM 370. The disclosed method uses input variables 371 that are stored in known locations 372, 373 in the memory 370. The input variables 371 are processed to produce output variables 377 that are stored in known locations 378, 379 in the memory 370. Intermediate variables 374 may be stored in additional memory locations in locations 375, 376 of the memory 370. Alternatively, some intermediate variables may only exist in the registers 354 of the processor 305.

The execution of a sequence of instructions is achieved in the processor 305 by repeated application of a fetch-execute cycle. The control unit 351 of the processor 305 maintains a register called the program counter, which contains the address in ROM 360 or RAM 370 of the next instruction to be executed. At the start of the fetch execute cycle, the contents of the memory address indexed by the program counter is loaded into the control unit 351. The instruction thus loaded controls the subsequent operation of the processor 305, causing for example, data to be loaded from ROM memory 360 into processor registers 354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 333, and is performed by repeated execution of a fetch-execute cycle in the processor 305 or similar programmatic operation of other independent processor blocks in the electronic device 301.

Figure 4:
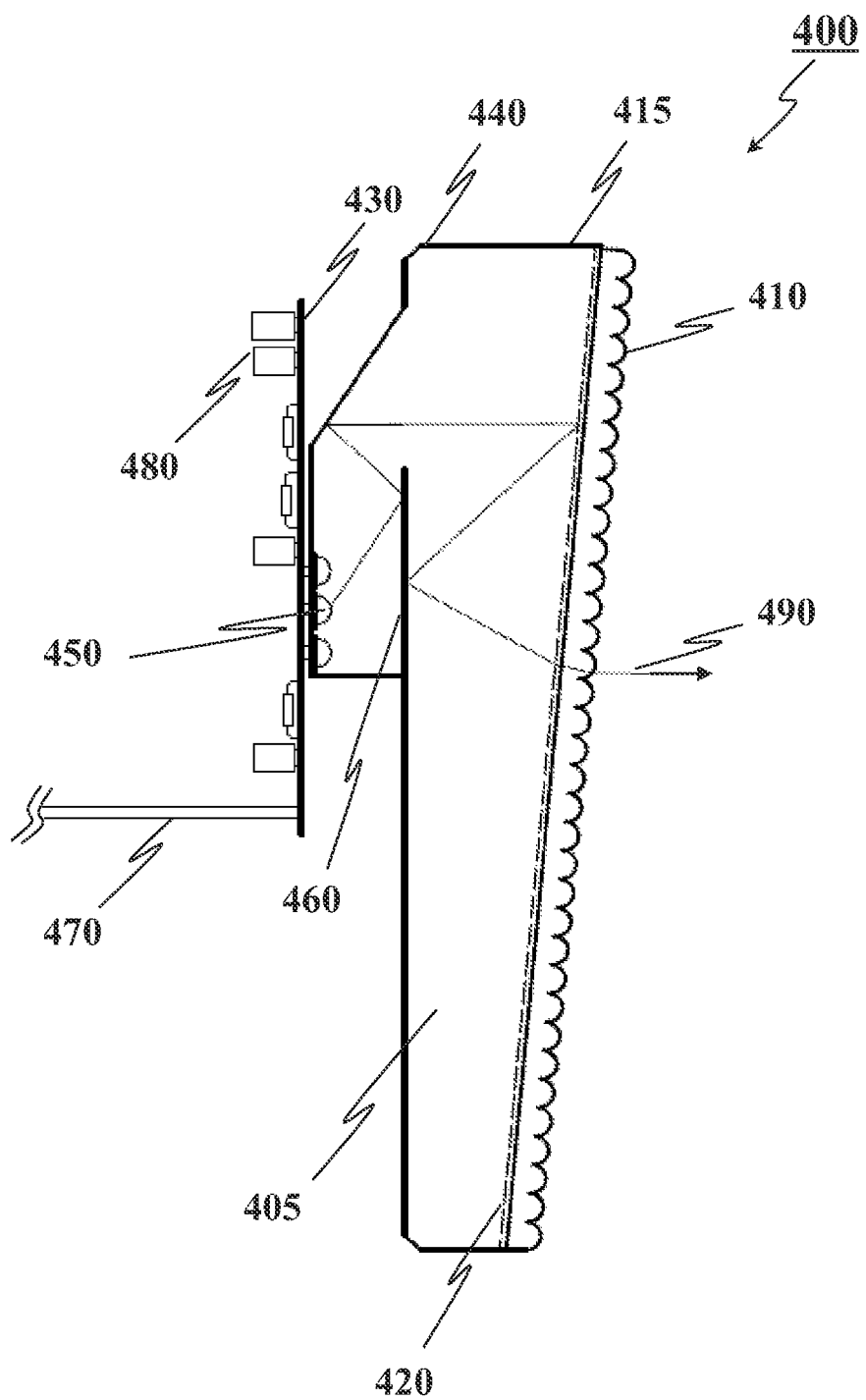
FIG. 4 shows a traffic lantern arrangement embodying a power supply system of the present disclosure.

FIG. 4 shows a cross-section of a traffic signal lantern 400 embodying a lighting supply system in accordance with the present disclosure. The traffic signal lantern 400 includes an input power supply 470. The input power supply may be, for example, a mains power supply. The traffic signal lantern also includes a printed circuit board 430 to which are coupled a number of electronic components 480. The electronic components 480 may include, for example, a microprocessor, resistors, capacitors, transformers, memory, transistors, and the like. In this example, the electronic components 480 are utilised to implement the power control system 100 of FIG. 1. In one implementation, the components 480 include one or more processors and memory units for implementing one or more of the rectifier 125, the squarer 145, the filter 155, the first function generator 160, the second function generator 170, the multiplier 180, and the power supply 190. The power control system implemented on the printed circuit board 480 receives the input power supply 470 to control light output by a lighting source 450, which is also coupled to the printed circuit board 480. In this example, the electronic components 480 include a resistive load corresponding to the dissipative load 120 of FIG. 1.

The traffic signal lantern 400 includes a hollow structural housing 415. An internal surface of the housing 415 defines a cavity 405. The traffic signal lantern 400 also includes the light source 450, which in this example is implemented using three LEDs. Depending on the application, a plurality of LEDs may be utilised in implementing the light source 450. The plurality of LEDs may be arranged, for example, in a linear pattern, a rectangular array, or any regular or irregular configuration to provide a light source appropriate for the housing 415.

A first portion 440 of the housing 415 is opaque to visible light and provides a reflector in the interior of the housing 415. That is, light that is incident on the first portion 440 from within the cavity 405 is not able to pass through the first portion 440 and that light is reflected back into the cavity 405. The reflector may be implemented by virtue of the first portion 440 possessing a different refractive index from the cavity 405, resulting in internal reflection within the cavity 405. Alternatively, the first portion may provide the reflector by virtue of a reflective coating or textured surface applied to the interior surface of the housing 415 or within the first portion 440. In a further alternative, a reflective coating or textured surface is applied to an exterior surface of the first portion 440 to reflect light back into the cavity 405.

The housing 415 further includes a second portion 420 that is opaque to visible light. The second portion 420 includes a plurality of apertures that allow light to pass from the cavity 405 on the interior of the housing 415 to the exterior of the housing 415. The second portion 420 may be implemented by using a perforated plate. Further implementations of the second portion may equally be practised, such as an inner surface of the second portion 420 being screen-printed or pad-printed to realise a predetermined arrangement of apertures. The inner surface of the second portion 420 is optionally a reflective surface, by virtue of the second portion 420 possessing a different refractive index from the cavity, resulting in internal reflection within the cavity. Alternatively, the second portion 420 may be reflective towards the cavity 405 by virtue of a reflective coating or textured surface applied to the interior surface of the housing 415 corresponding to the second portion 420 or within the second portion 440. In a further alternative, a reflective coating or textured surface is applied to an exterior surface of the second portion 420 to reflect light back into the cavity 405.

The traffic signal lantern 400 also includes a lens unit 410 adjacent to the second opaque portion 420. In this example, the lens unit 410 includes a plurality of substantially spherical lens elements, wherein each lens element is aligned with a corresponding one of the plurality of apertures in the second portion 420. The lens unit 410 can be coupled to the second opaque portion 420 or alternatively the lens unit 410 and second opaque portion may be integrally formed with one another.

As shown in FIG. 4, in this example the second portion 420 of the housing 415 and the lens unit 410 are angled slightly downward, in the range of approximately 5 degrees to 20 degrees to enable light emitted from the traffic signal lantern 400 to be seen more easily by road users at street level.

The traffic signal lantern 400 further includes, in this example, an optional baffle 460 disposed within the cavity 405. The baffle 460 is positioned relative to the light source 450 such that light emitted from the light source 450 is incident on at least one surface within the housing 415 before passing through an aperture of the second opaque portion 420. The baffle may be integrally formed with the housing 415, such as through an injection moulding process. Alternatively, the baffle 460 is disposed within the cavity 405, through coupling to an internal surface of the housing 405, or some other means.

FIG. 4 shows a light trace 490 of a light photon emitted from the light source 450. In the example shown, light emitted from a second one of the three LEDs in the light source 450 is incident on the baffle 460 and is reflected to be incident on the first opaque portion 440 of the housing 415. The light 490 is reflected to be incident on the second opaque portion 420, whereupon the light 490 is reflected back towards the cavity 405. The light 490 is then incident on the baffle 460 before being reflected back towards the second opaque surface 420. In this example, the light 490 passes through one of the plurality of apertures in the second opaque portion 420 and passes through a corresponding lens element in the lens unit 410 to be emitted to an exterior of the traffic signal lantern 400.

As described above, various functions of the power control system 110 may be implemented using digital computing techniques. Such embodiments may utilise, for example, one or more computer instructions executed by a microprocessor to perform a desired function. Such computer instructions and microprocessor may form part of an embedded device, as described above with reference to FIGS. 3A and 3B and FIG. 4.

In one embodiment, the squaring module 145 is implemented using a computer program in the form of a set of instructions stored in a computer-readable memory for retrieval and execution on a microprocessor. An example of suitable instructions, presented in pseudo-code, for performing the functionality of the squaring module 145 is presented in Table 1. If the input power supply is non-sinusoidal, the instructions of Table 1 are executed approximately every 200 microseconds. If the input power supply is substantially sinusoidal, the instructions of Table 1 may be executed less often than the non-sinusoidal case. In the sinusoidal case, the Nyquist sampling rate is twice the mains frequency, whereas in the non sinusoidal case a rate of 5000 samples per second (yielding samples every 200 microseconds) is necessary to properly sample the highest frequencies present without errors due to aliasing.

TABLE 1 squarerInput = getInputSample( );
squarerOutout = squarerInput * squarerInput;

In one embodiment, the filter 155 is implemented using a computer program in the form of a set of instructions stored in a computer-readable memory for retrieval and execution on a microprocessor. An example of suitable instructions, presented in pseudo-code, for performing the functionality of the filter 155 is presented in Table 2, wherein the functionality of the filter 155 is called "lowpassFilterFunction". The instructions of Table 2 are executed typically whenever a new output is available from the output of the squaring module 145.

TABLE 2 filterOutput = lowpassFilterFunction(squarerOutput);

In one embodiment, the first function generator 160 is implemented using a computer program in the form of a set of instructions stored in a computer-readable memory for retrieval and execution on a microprocessor. An example of suitable instructions, presented in pseudo-code, for performing the functionality of the first function generator 160 is presented in Table 3.

TABLE 3 functionGenerator160Output = 0 for filterOutput < BreakPoint1
functionGenerator160Output = 50 for BreakPoint 1 < filterOutput < BreakPoint2
functionGenerator160Output = 100 for filterOutput > BreakPoint2

Computer program instructions for performing an alternative transfer function in the first function generator 160 are shown in Table 4, wherein a suitable interpolating function is selected for filter output values between BreakPoint1 and BreakPoint2.

TABLE 4 functionGenerator160Output = 0 for filterOutput < BreakPoint1
functionGenerator160Output = 100 for filterOutput > BreakPoint2

In one embodiment, the second function generator 170 is implemented using a computer program in the form of a set of instructions stored in a computer-readable memory for retrieval and execution on a microprocessor. An example of suitable instructions, presented in pseudo-code, for performing the functionality of the second function generator 170 is presented in Table 5, wherein a function "pow" raises "filterOutput" to the power "Power". This is a commonly available library function. A value of about −0.2 for the constant "Power" could be chosen.

TABLE 5 functionGenerator170Output = pow(filterOutput,Power)

In one embodiment, the multiplier 180 is implemented using a computer program in the form of a set of instructions stored in a computer-readable memory for retrieval and execution on a microprocessor. An example of suitable instructions, presented in pseudo-code, for performing the functionality of the multiplier 180 is presented in Table 6. The "getInputSample" function is the same function as used in Table 1 in respect of the "squarer" function described above. The result of the call made in the "squarer" function and held in "squarerInput" could be used here in place of the extra call to "getInputSample". The call is shown here explicitly for clarity of exposition. The output from the multiplier 180 controls the instantaneous current drawn by the power supply 190.

TABLE 6 multiplierOutput = getInputSample( ) * functionGenerator170Output;

INDUSTRIAL APPLICABILITY

The arrangements described are applicable to the electrical power and lighting industries and particularly for the signalling and traffic control industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

I claim:

1. A power supply system for controlling supply of power to an electric lighting device, said system comprising:
    a first function generator for generating a light control signal, dependent upon a first mathematical function of a root mean square (RMS) value of a received input voltage;
    a second function generator for generating a current control signal, dependent upon a second mathematical function establishing a ratio of instantaneous input voltage to instantaneous input current as a mathematical function of the RMS value of said received input voltage, wherein said first function and second function are independent of one another; and
    a power supply for presenting a light power signal to said electric lighting device and for presenting a load power to a dissipative load, dependent upon said light control signal, said current control signal, and said received input voltage.

2. The power supply according to claim 1, wherein said ratio of instantaneous input voltage to instantaneous input current is substantially constant.

3. The power supply according to claim 1, wherein said ratio of instantaneous input voltage to instantaneous input current of said second mathematical function is a scalar multiple of a mathematical function relating a ratio of the instantaneous voltage and an instantaneous current to the RMS input voltage of tungsten filament incandescent lamp.

4. The power supply according to claim 1, wherein said second mathematical function relating the ratio of the instantaneous voltage and the instantaneous current to the RMS input voltage is a power function in which the ratio of the instantaneous voltage and the instantaneous current is proportional to the RMS value of the received input voltage raised to a power in the range of −1.0 to 1.0.

5. The power supply according to claim 4, wherein said power is about 0.4.

6. The power supply according to claim 1, wherein said first function utilises a break-point function, such that said light power signal presented to said electric lighting device is:
- 0, for input RMS voltages below a first predetermined threshold V1;
- 50% of nominal power, for input RMS voltages between a first predetermined threshold V1 and a second predetermined threshold V2;
- an amount of power between 50% and 100% of nominal power, for input RMS voltages between said second predetermined threshold V2 and a third predetermined threshold V3; and
- 100% of nominal power, for input RMS voltages above said third predetermined threshold.

7. A power control system for a light emitting diode (LED) lighting device, said system comprising:
- a first function generator for utilising a first function to generate a light control signal dependent upon a received input voltage;
- a second function generator for utilising a second function to generate a conductance factor dependent upon said received input voltage, wherein said first function and said second function are independent functions of the root mean square (RMS) value of said input voltage;
- a multiplier for determining a current control signal dependent upon said first multiplier signal and said received input voltage; and
- a power supply for generating an input light power to present to said electric lighting device and an input load power to present to a dissipative load, dependent upon said light control signal, said current control signal, and said received input voltage.

8. A method for controlling power supplied to a light emitting diode (LED) lighting device, said method comprising the steps of:
- determining a light control signal dependent upon a received input voltage and a first function, wherein said first function is a function of the root mean square (RMS) value of said received input voltage;
- determining a conductance factor dependent upon said received input voltage and a second function, wherein said second function is a function of the RMS value of said received input voltage, said first and second functions being independent of one another;
- determining a current control signal dependent upon said conductance factor and said received input voltage; and
- generating an input light power to present to said lighting device and an input load power to present to a dissipative load, dependent upon said light control signal, said current control signal, and said received input voltage.

9. The method according to claim 8, wherein said dissipative load is selected from the group consisting of: a resistor; an active dissipative device; and a Zener diode.

10. The method according to claim 8, wherein said received input voltage is derived from a mains power supply.

11. The method according to claim 8, wherein at least one of said first function and said second function is a break-point function.

12. The method according to claim 8, wherein said LED lighting device is selected from the group of lighting devices consisting of: a road traffic control lantern; a railway signal lantern; and operating theatre lighting.

13. The method according to claim 8, comprising the further steps of:
- rectifying said received input voltage to produce a direct current input voltage;
- squaring said direct current input voltage to determine a squared voltage proportional to the square of the received input voltage; and
- filtering said squared voltage to produce a steady state signal for use in determining said light control signal, wherein said steady state signal is proportional to an average of the square of the received input voltage.

14. The method according to claim 13, wherein said squaring includes the steps of:
- sampling instantaneous values of said direct current input voltage; and
- squaring those instantaneous values.

15. The method according to claim 8, wherein said second function is a transfer function that produces a power function of the RMS value of the received input voltage.

16. A power control system for a light emitting diode (LED) lighting device, said system comprising:
- a rectifier for rectifying a received input voltage;
- a squaring module for squaring said rectified input voltage to determine a squared voltage value proportional to the square of the received input voltage;
- a filter to filter said squared input voltage and produce a steady state signal;
- a first function generator for applying a first function to the steady state signal to determine a light control signal;
- a second function generator for applying a second function to the steady state signal to determine a conductance factor, wherein said first function and said second function are independent functions of the root mean square (RMS) value of said input voltage;
- a multiplier for multiplying said conductance factor with said rectified input signal to determine a current control signal; and
- a power supply for producing an input light power to said LED lighting device and an input load power to a dissipative load, dependent upon each of said light control signal, said current control signal, and said rectified input voltage.

17. The power control system according to claim 16, wherein said system is adapted for use in at least one of a traffic signal lantern, a railway signal lantern, and an operating theatre light.

18. A method for controlling power supplied to a light emitting diode (LED) lighting device, said method comprising the steps of:
- rectifying a received input voltage waveform;
- squaring said rectified input voltage waveform to determine a squared voltage value proportional to the square of the received input voltage;
- filtering said squared input voltage to produce a steady state signal;
- applying a first function to the steady state signal to determine a light control signal, dependent upon said received input voltage;
- applying a second function to the steady state signal to determine a conductance factor, dependent upon said received input voltage, wherein said first function and said second function are independent functions of the root mean square (RMS) value of said input voltage;
- multiplying said conductance factor and said rectified input voltage waveform to determine a current control signal; and
- generating an input light power for presenting to said LED lighting device and an input load power for presenting to a dissipative load, dependent upon said light control signal, said current control signal, and said rectified input voltage.

* * * * *